S. W. MARTIN.
SCREW-CUTTING TAP.

No. 178,651. Patented June 13, 1876.

Witnesses:
Donn I. Twitchell.
Will H. Dodge.

Inventor:
S. W. Martin
By his atty's
Dodge & Son.

UNITED STATES PATENT OFFICE.

SAMUEL W. MARTIN, OF SPRINGFIELD, OHIO, ASSIGNOR OF ONE-HALF HIS RIGHT TO PHINEAS P. MAST, OF SAME PLACE.

IMPROVEMENT IN SCREW-CUTTING TAPS.

Specification forming part of Letters Patent No. 178,651, dated June 13, 1876; application filed May 16, 1876.

*To all whom it may concern:*

Be it known that I, SAMUEL W. MARTIN, of Springfield, in the county of Clarke and State of Ohio, have invented certain Improvements in Screw-Cutting Taps, of which the following is a specification:

My present invention consists of a tap for cutting screw-threads, having its thread-cutting jaws pivoted in the stock or holder in such a manner that when the tool is reversed after cutting the thread the jaws will be drawn inward out of the threads, so that the tool can be withdrawn at once without screwing it out. And it further consists in combining with said jaws detachable cutting-lips, by which the hole can be reamed out at the same time or by the same operation that cuts the threads, all as hereinafter more fully described.

Figure 1:
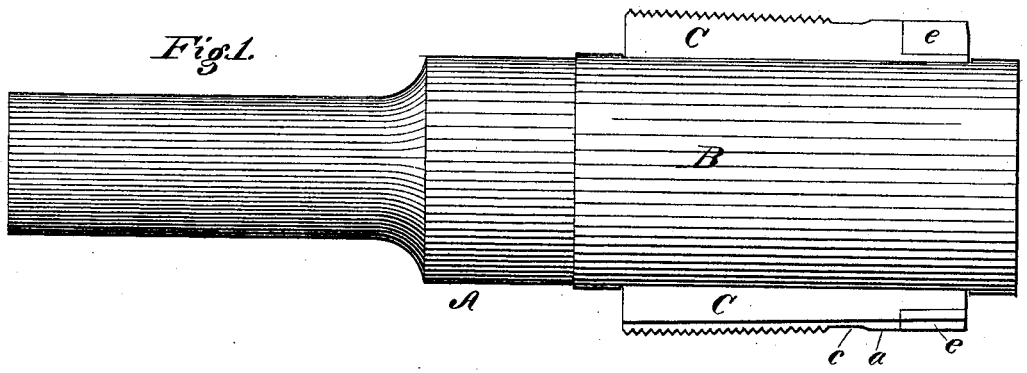
Figure 2:
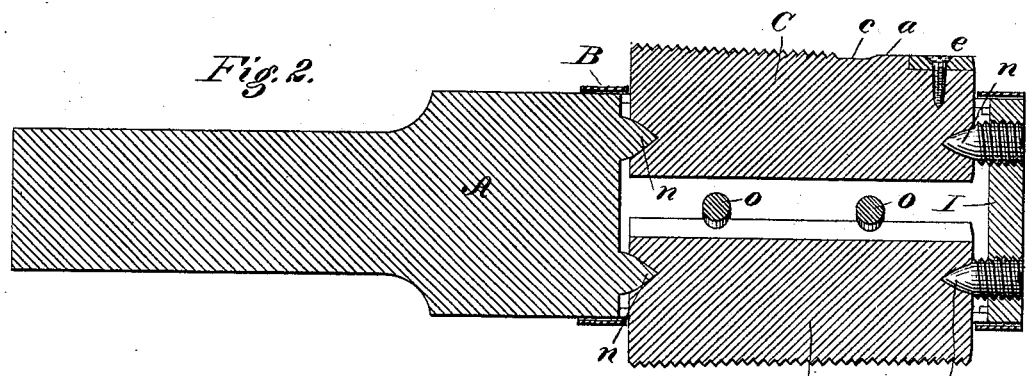

Figure 1 is a side elevation of the tool complete. Fig. 2 is a longitudinal section of the same, on the line $x\ x$ of Fig. 3; and Fig. 3 is an end view, with the cap or end piece removed.

Figure 3:
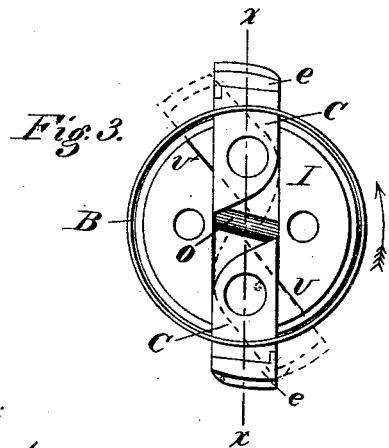
Figure 4:

To construct my improved tap I provide a mandrel or stock, A, which consists of a round bar of proper size having a slot transversely in its end of a size to receive the jaws, as represented in Figs. 2 and 3. I then provide a tubular sleeve, B, of a size to fit closely but loosely over the slotted end of the stock A, which has a slot in its opposite sides of such a size as to permit the jaws to fit therein. I then provide two jaws, C, of the requisite length and size, made slightly tapering, and having screw-cutting teeth formed on their outer edges, said teeth extending from the rear end of the jaws forward for two-thirds or more of their length, as shown in Fig. 1. At their front ends a recess is formed on the outer edge, and extending a short distance down on their front side, in which is fitted a cutting-lip, e, as shown in Figs. 1, 2, and 3, the lip being shown detached in Fig. 4. Immediately in rear of these lips the edge of the jaws is left smooth and flush with the outer face of the lips e, thus forming a bearing to guide and steady the jaws in their operation, there being a slight depression, c, in the outer face of the jaws between this bearing-point a and the teeth, as shown in Figs. 1 and 2. Upon their inner edges these jaws C are beveled, as shown in Fig. 3, so as to permit them to swing or turn on their pivots or bearings n. The pivots n are arranged as shown in Fig. 2, those at the rear end being fixed permanently in the stock A, and those at the front end being held by a cap, I, which is preferably made detachable, and secured in place by screws, and a flange fitting in a recess turned for it on the end of the stock, so as to secure it firmly in place, though it is obvious that this cap I may be omitted, and the end of the stock left solid, if preferred, the outer pivots being formed with screw-threads, as shown in Fig. 2, so they can be screwed in or out at pleasure to insert or remove the jaws.

By examining Fig. 3 it will be seen that along the slot in which the jaws are fitted the edge or shoulder of the stock is cut away or beveled off, as at v, along the front side of each jaw, the object being to permit the jaws to swing laterally, as indicated by the dotted lines in Fig. 3.

Two pins, O, are inserted obliquely across the slot, as shown in Fig. 3, on which the inner edges of the jaws bear, when turned so as to stand radially, or in working position.

In cases where the top can be inserted but a short distance, and it is desired to cut the thread all the way, the jaws will be made without the boring or cutting lip e, and the teeth made to extend to the front end, as shown in the lower side of Fig. 2.

The sleeve, being loose on the stock, will turn thereon as the jaws are swung either way, and, fitting close to the jaws, it covers the recesses in front of the jaws and prevents chips, &c., from entering.

These tools may be made of any size required, and each stock can be provided with sets of jaws differing in width from the pivots outward in graduated sizes, so that, with the one tool thus provided, holes of various sizes may be tapped. The jaws are easily and cheaply made, and can be very quickly sharpened by grinding their front faces.

It will be seen that when thus constructed and arranged, the jaws, when standing radially, as they will when the tool is being used, will be firmly supported by the wall of the slot on their rear face, which bears against them to the outer edge of the stock, their lower front edges at the same time bearing against the opposite wall of the slot, thus holding them firmly in position, the cross-pins o at the same time preventing them from being forced inward.

If desired, instead of the pins O, a solid flat piece may be inserted the whole length of the slot, its edges fitting in recesses made for it in the opposite walls; or a solid cross-piece or portion may be left when the slots or recesses are cut in the stock for the jaws. The pins O, together with the pivots n, which latter, if preferred, may be cylindrical instead of pointed, are found in practice to be sufficient.

To use the tool, it is simply inserted in the hole, and rotated in the direction indicated by the arrow, Fig. 3. When the thread is cut, the motion is reversed, which causes the jaws to assume the position indicated by the dotted lines, thus throwing their outer edges inward, as they are pivoted eccentrically, which withdraws the teeth from the threads, thus permitting the tool to be withdrawn without screwing it out, as in the case of ordinary taps.

The advantages of such a tool, where a large number of holes are to be tapped, are too obvious to require mentioning.

Having thus described my invention, what I claim is—

1. A screw-cutting tap, consisting of a stock or mandrel, A, with the screw-cutting jaws C, pivoted eccentrically therein, said stock and jaws being constructed to operate substantially as described.

2. In combination with the stock A and the pivoted jaws C, the loose sleeve B, arranged to operate as set forth.

3. In combination with the pivoted jaws C, the supporting-pins O, or their equivalent, arranged to operate substantially as described.

4. In combination with the stock A and the pivoted jaws C, the cap or end piece I, constructed substantially as set forth.

5. The pivoted screw-cutting jaws C, having the detachable cutting or boring lip e, constructed and applied thereto, substantially as shown and described.

6. In a screw-cutting tap, one or more screw-cutting jaws, pivoted so as to swing laterally on its bearings or pivots, substantially as described.

SAMUEL W. MARTIN.

Witnesses:
CHAS. A. HARRIS,
A. E. FOLGER.